Oct. 18, 1960  E. H. BLATTNER  2,956,693
DRAFT RIGGING
Filed Sept. 13, 1956  3 Sheets-Sheet 1
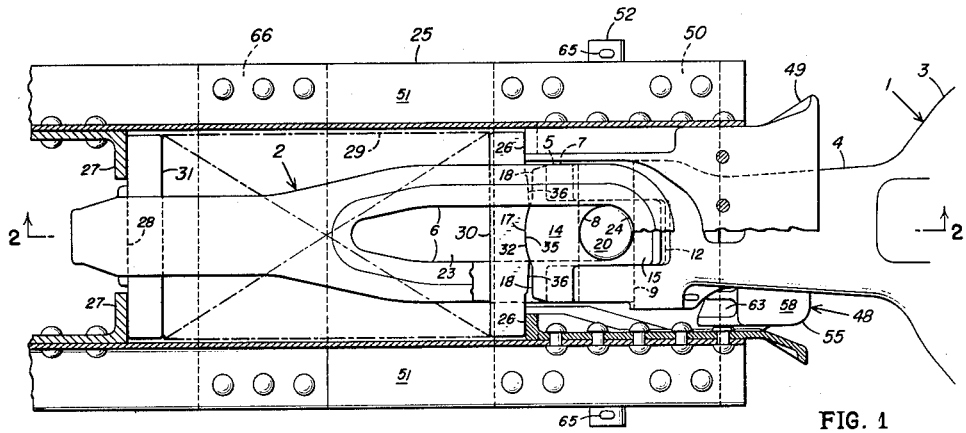
FIG. 1
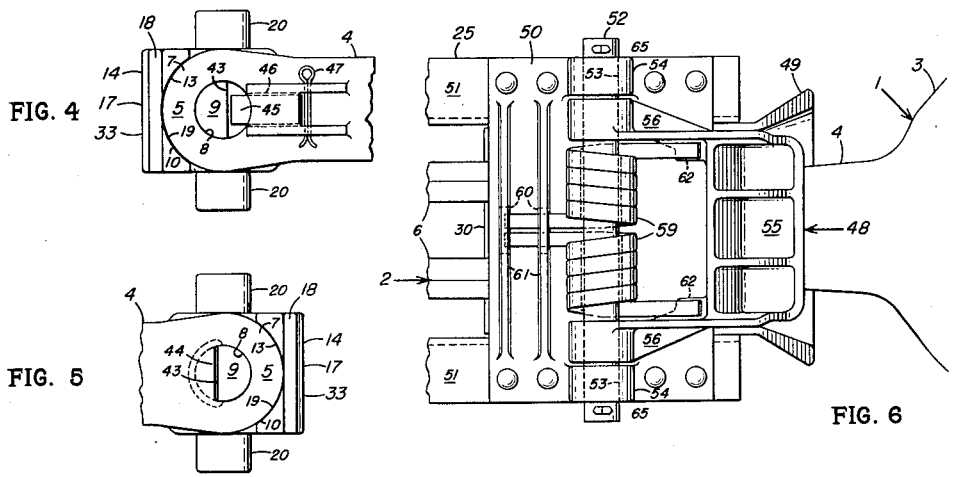
FIG. 4
FIG. 5
FIG. 6
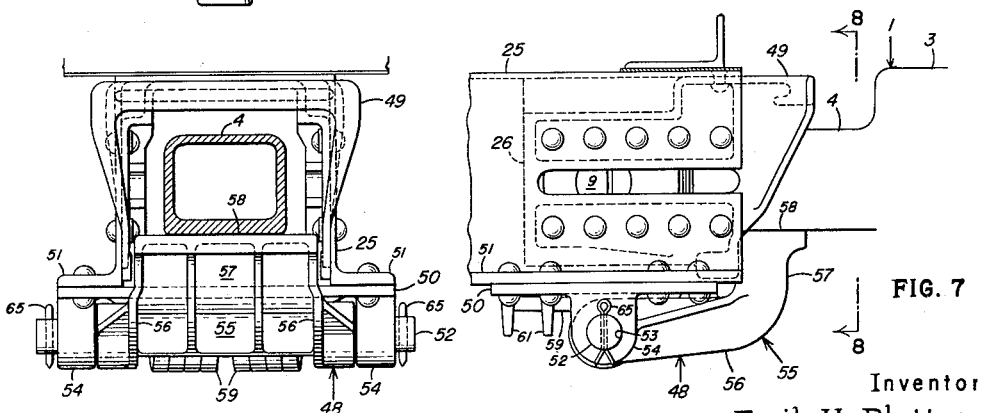
FIG. 7
FIG. 8
Inventor
Emil H. Blattner
By Wilmer Mechlin
his Attorney Oct. 18, 1960     E. H. BLATTNER     2,956,693

DRAFT RIGGING

Filed Sept. 13, 1956     3 Sheets-Sheet 2

Inventor:
Emil H. Blattner
By Wilmer Mechlin
his Attorney

Oct. 18, 1960

E. H. BLATTNER 2,956,693

DRAFT RIGGING

Filed Sept. 13, 1956

Inventor:
Emil H. Blattner
By Wilmer Mechlin
his Attorney

United States Patent Office 2,956,693
Patented Oct. 18, 1960

2,956,693

DRAFT RIGGING

Emil H. Blattner, Williamsville, N.Y., assignor to Symington Wayne Corporation, a corporation of Maryland Filed Sept. 13, 1956, Ser. No. 609,572

18 Claims. (Cl. 213—72)

This invention relates to draft rigging and has for its primary object the provision of an improved connection between a coupler and a yoke whereby surface contact between engaging surfaces is maintained throughout the range of relative movement of the coupler.

Several types of universal connections have been proposed for connecting a coupler and a yoke but only two have found acceptance, one in the standard type H coupler and the other in the alternate standard type F coupler. While these couplers are both of the interlocking type with the slack between mating couplers reduced to a minimum consistent with cost, the universal connections used with them differ markedly. That for the H coupler is a cross pin universal joint in which the coupler and yoke are each pivotally connected to an interposed radial connector for pivoting about axes at right angles and displaced longitudinally relative to each other, the connection being made by a pair of pins. The connection for the F coupler employs a single pin disposed on a vertical axis about which the coupler is enabled to angle vertically by forwardly tapering the front wall of the pin-receiving opening in the coupler above and below its center and interposing between the pin and the rear wall of that opening a filler having a pair of cylindrical surfaces disposed normal to each other, one concave for engaging the pin and the other convex for engaging a correspondingly curved portion of the rear wall of the opening. While practical for passenger cars, the type of radial connection used with H couplers adds too much to the overall length of the unit to suit the coupler to freight car use and renders it practically impossible to employ an associated draft gear for restraining relative angling of the coupler. In the case of the F coupler, use is made of a draft gear for restraining horizontal angling of the coupler by forming the butt of the coupler as a sphere with a cylindrically convex surface at the other side, the spherical surface fitting in a corresponding pocket in a front follower block within a yoke and the wings being adapted to engage the face of the block at either side of the pocket after predetermined relative angling of the coupler so as to angle or cant the block thereafter with the coupler and thus energize the draft gear to enable the latter to exert a force tending to center the coupler. The trouble with this arrangement in the F coupler connection is that at the limits of horizontal angling, particularly when the coupler is simultaneously angling vertically, as under buffing force, the engaged wing has point or, at most, line contact with the face of the follower block with consequent rapid wear of both.

Another object of the present invention is to provide a coupler and a yoke having an improved universal connection, which is comparable in length with the universal connection for the F coupler and, while capable of limiting the unrestrained relative angling of the coupler in either or both directions, maintains surface contact between engaging surfaces throughout the restrained, as well as the unrestrained, relative angling of the coupler.

An additional object of the invention is to provide an improved draft rigging having a coupler universally connected to a yoke and resiliently supported against downward movement, wherein not only is surface bearing maintained between the engaging surfaces of the connection, but surface bearing is also obtained between the coupler and the resilient support throughout substantially the full range of angling of the coupler.

A further object of the invention is to provide a coupler and a yoke having an improved universal connection wherein a coplanar cross axis pin connection is obtained through a universal swivel butt casting to which each of the coupler and yoke is pivotally connected, one by a pin and the other by trunnions and, through cylindrical interfitting surfaces, full bearing is maintained between the engaging parts throughout the range of longitudinal movement and relative angling of the coupler.

Another object of the invention is to provide a coupler and a yoke having an improved universal connection of the cross axis pin type, wherein the yoke is pivotally connected to the universal connector through trunnions integral with the latter and riding in elongated slots in the yoke straps, the slots not only facilitating assembly of the several components but affording a ready means for bringing a cushioning mechanism within the yoke into play under buffing forces in arrangements in which one or more mechanisms are interposed between the rear end of the yoke and the rear stop lugs.

Another object of the invention is to provide a resilient support which is mounted on a car underframe for pivoting about a horizontal axis aligned vertically with the normal center of angling of the coupler so as to maintain substantially full surface contact with the shank of the coupler during downward angling thereof and which torsionally resists such downward movement.

Another object of the invention is to provide an improved universal connection between a coupler and a yoke which is of simple and rugged construction, subject to a minimum of wear and, while readily assemblable and disassemblable, is proof against accidental disconnection of the parts.

Other objects and advantages of the invention will appear hereinafter in the detailed description, be particularly pointed out in the appended claims and be illustrated in the accompanying drawings, in which:

Figure 1 is a top plan view of the improved draft rigging of the present invention with portions broken away and shown in section to more clearly illustrate certain of the details of construction.

Figures 4 and 5 are fragmentary side elevational views taken from opposite sides and on the scale of Figure 1, showing a preferred means for locking the coupler connecting pin in place.

Figure 6 is a fragmentary bottom plan view of the resilient support and related part of the draft rigging of Figure 1.

Figure 7 is a side elevational view of the structure of Figure 6.

Figure 8 is a vertical sectional view taken along the lines 8—8 of Figure 7.

Figure 2:
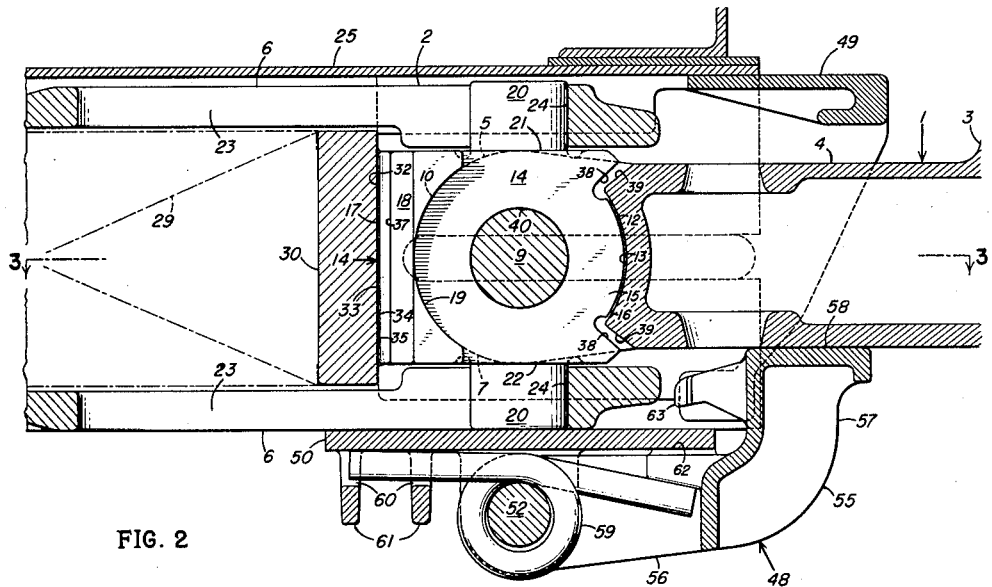
Figure 2 is a fragmentary vertical sectional view on an enlarged scale taken along the lines 2—2 of Figure 1.
Figure 3:
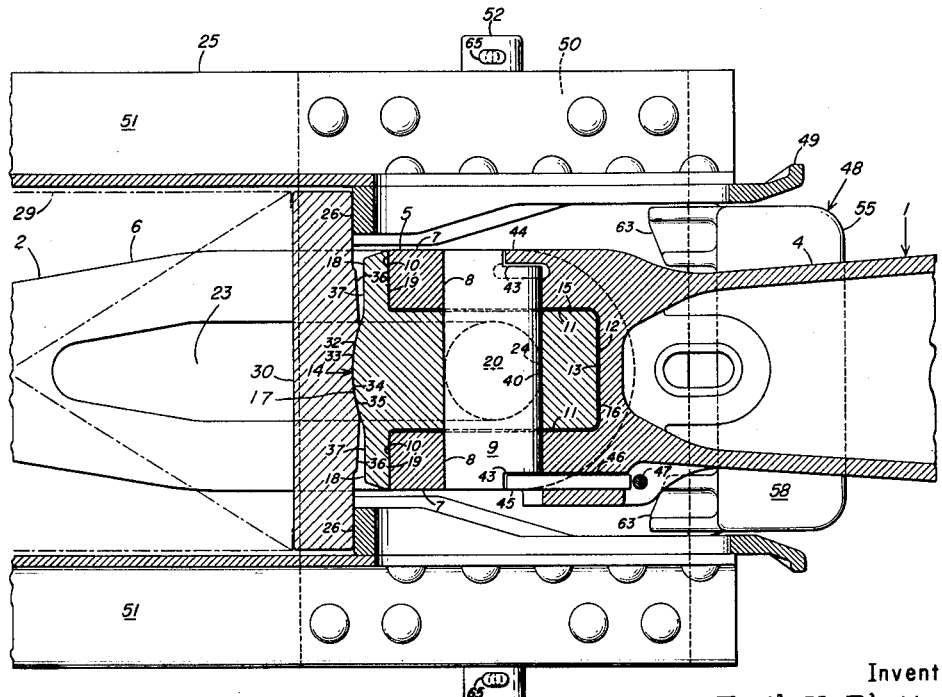
Figure 3 is a horizontal sectional view on the same scale as and taken along the lines 3—3 of Figure 2.
Figure 11:
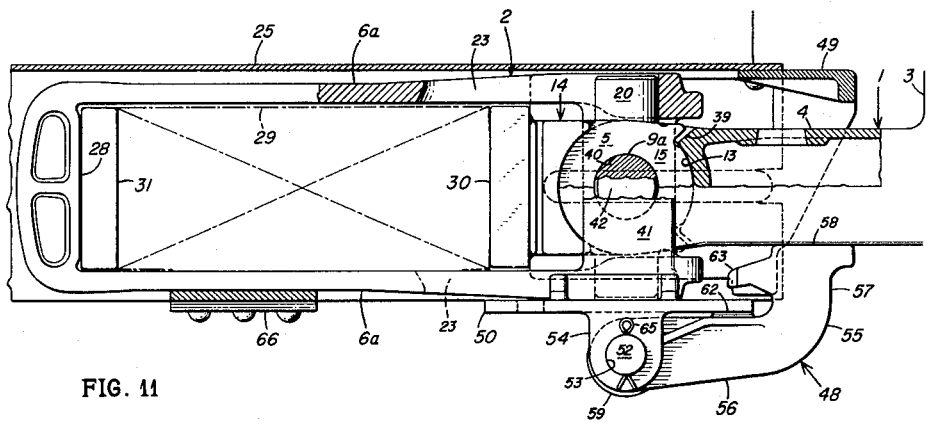
Figure 11 is a vertical sectional view taken along the lines 11—11 of Figure 10.

Referring now in detail to the drawings, in which like reference characters designate like parts, the improved draft rigging of the present invention contemplates connecting a coupler member and a yoke member by a pair of pin means, each pivotally connected to one of the members and having an axis coplanar with or intersecting and normal or at right angles to the axis of the other pin means, this connection hereinafter being termed a "coplanar, cross or cross axis pin connection." In its preferred form the improved draft rigging is comprised of a coupler 1 universally connected in a manner hereinafter to be described to a yoke 2. The coupler has a head 3 of a suitable type, such, for example, as the so-called "interlocking" head used on the A.A.R. type F or H coupler and a shank 4, the butt or rear end 5 of which extends between the straps or arms 6 of the yoke 2. For connection to the illustrated vertical yoke, the butt 5 of the coupler is bifurcated vertically to provide a pair of horizontally or transversely spaced hinge loops or flanges 7 interrupted or pierced horizontally by aligned cylindrical pin holes or openings 8 for receiving a cylindrical pivot pin 9. The hinge loops 7 have at their rear ends convexly cylindrical bearing faces 10 which are coaxial with the pin holes 8 and pivot pin 9 and together define the substantially planar and parallel sides 11 of an interposed socket 12 which terminates forwardly of the pin holes 8 in a concavely cylindrical wall 13 also coaxial with the pivot pin 9.

Connected to the coupler by the pivot pin 9 and in effect forming with the shank 4 a two-part stem for the coupler, is a connector or universal connecting or butt casting or buffing block 14, generally of T-shape and having a tongue 15 received or fitting within the socket 12 between the hinge loops 7 and ending forwardly in a convexly cylindrical front wall 16 substantially coradial (having a common radius) and coaxial with the front wall 13 of the socket 12. Integral with the flat-sided tongue 15, the head 17 of the universal block 14 has at either side flange portions 18 which overlie and through concavely cylindrical bearing surfaces 19 is adapted to have bearing engagement with the bearing faces 10 on the hinge loops 7 with which they are both coradial and coaxial.

So interrelated, the coupler and universal block can swivel, pivot or angle about a horizontal axis relative to each other and, during such angling, maintain surface bearing between their respective bearing faces and surfaces 10 and 19 and, if desired, also between the front wall 16 of the tongue 15 and that 13 of the socket 12. To universally connect the coupler 1 and the yoke 2, it remains to connect the universal block 14 to the yoke so that these members can swivel, pivot or angle relative to each other about an axis at right angles or normal to that of the pivot pin 9. This is accomplished by the provision of a pair of coaxial cylindrical trunnions or pins 20 integral with and projecting from opposite sides, here the top 21 and bottom 22, of the tongue 15, the axis of the trunnions crossing or intersecting at right angles and being coplanar with the axis of the pivot pin 9. These trunnions 20 are received in a pair of longitudinally elongated slots 23, one in each of the straps or arms 6 of the yoke 2, the slots having concavely cylindrical forward ends 24 coradial with the trunnions for surface bearing or engagement therewith under draft forces.

With the yoke 2 fitting as usual within center sill 25 which may be fixedly or floatingly connected to the underframe (not shown) of a railway car (not shown), its length and form rearwardly of the slots 23 will depend upon the type of cushioning mechanism which the yoke is designed to pocket and the size of the draft gear pocket between the front and rear stop lugs 26 and 27 fixed to the center sills 25. For purposes of illustration, each of the disclosed forms of the yoke 2 has been shown as having its straps 6 connected at their rear ends by a rear wall 28 and as pocketing a draft gear or other cushioning mechanism indicated diagrammatically at 29 and disposed between front and rear followers or follower blocks 30 and 31, respectively.

Serving as the medium through which buffing forces are applied to the cushioning mechanism 29 within the yoke 2, the front follower block 30 is designed to bear against or engage the rear face 32 of the universal block 14, except when the latter moves forwardly relative to the front stop lugs 26 on compression of the cushioning mechanism 29 in draft. The universal block 14 being angleable horizontally about its trunnions 20 as the coupler angles correspondingly, the rear face 32 of the universal block 14 is caused to have surface bearing on relative angling of these members while they are in engagement by forming at least the central portion of the rear face on the block as a convexly cylindrical bearing surface 33 coaxial with the trunnions 20 and providing a forwardly facing, concavely cylindrical socket 34 in the front face 35 of the front follower block, the socket being coradial and normally coinciding in axis with the bearing surface 33 on the block.

It is preferred to limit the relative free angling of the universal and front follower blocks 14 and 30, respectively, in order that over the outer limits of horizontal angling of the coupler 1 the blocks will angle in unison, the consequent canting of the front follower block and energizing of the cushioning mechanism 29 thereby enabling the latter to exert a force tending to center the coupler. This is accomplished by providing on the front follower block 30 a pair of vertically extending flat shoulders 36, one at either side of the socket 34 and each adapted to engage one of a pair of flat limiting surfaces 37 disposed at corresponding sides of the cylindrical bearing surface 33, each of the shoulders 36 and the companion flat surface 37 on the universal block normally being so spaced and angularly disposed relative to each other as to engage only at one of the limits of relative free angling of the blocks. As will be seen, the central portion of the front follower block is thickened to accommodate the socket 34 without reducing the block's strength and, as will be understood, the flat shoulders and limiting surfaces are of such lateral or transverse extent as to insure that, during the restrained relative horizontal angling of the coupler, both they and the cylindrical surfaces which they limit will maintain surface contact.

With the outer limits of horizontal angling of the coupler preferably restrained in the manner above described, a corresponding restraint may be, and preferably is, imposed on vertical angling of the coupler by demarking or limiting the convexly cylindrical front surfaces 16 of the tongue 15 of the universal block 14 by a pair of flat faced, vertically directed abutments 38 each normally spaced from and adapted, at one of the predetermined upper and lower limits of free vertical angling of the coupler, to have surface contact or engagement with the corresponding of a pair of forwardly divergent stop faces 39 demarking or adjacent the vertical extremities of the concavely cylindrical front wall 13 of the socket 12. With the limits of free vertical angling of the coupler so established, once one or the other of these limits is reached, the coupler and universal block will angle vertically in unison with consequent canting of the front follower block 30 and energizing of the cushioning mechanism 29 so that the latter, on release of the force causing the angling, will tend to restore the coupler to normal position.

It has been mentioned that the pin holes 8 in the hinge loops 7 are cylindrical and coradial with the pivot pin 9 and this also applies to the pin hole 40 in the tongue 15 of the universal block 14. If, however, it is desired to relieve the pin of shear stresses under buffing forces, such forces may be shifted entirely to the hinge loops without in anywise affecting the operation of the universal connection by either rearwardly elongating the pin hole 40 in the tongue or forwardly elongating the pin holes 8 in the hinge loops and spacing slightly the confronting cylindrical front faces 13 and 16 of the socket 12 and tongue 15, respectively.

Figure 9:
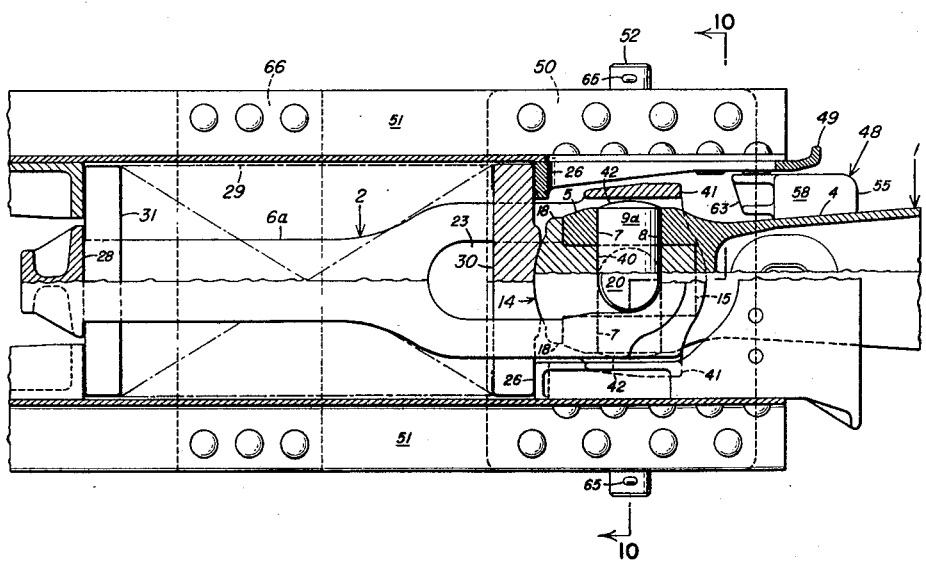
Figure 9 is a plan view of a draft rigging embodying the present invention and showing the coupler of the preceding figures connected to a modified form of yoke with portions broken away and shown in section to more clearly illustrate certain of the details of construction.
Figure 10:
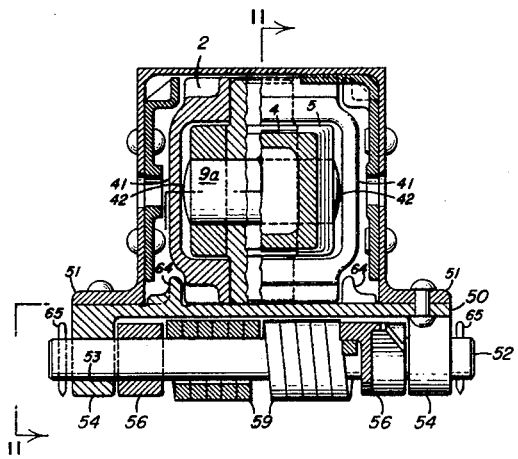
Figure 10 is a vertical sectional view taken along lines 10—10 of Figure 9.

While identical in major respects, there are some differences in the draft riggings of Figures 1 and 9 and these will now be described. The main difference in the two illustrated embodiments is in the form of their yokes 2. That of Figure 1 has its arms or straps 6 unconnected except at their rear ends while that of Figure 9, which hereinafter will be designated as 2a, is of the type known as a "hooded" yoke with the front ends of its arms 6a connected at either side by spaced webs 41 of sufficient longitudinal extent to enclose the ends of the pivot pin 9a over the range of rearward movement in buff of the coupler relative to the yoke. The webs or hood portions 41 serve to rigidify the yoke but also function effectively as a holding means for retaining the pivot pin 9a in connecting position, the ends 42 of the pivot pin being arcuately convex and, for simplicity in manufacture, preferably convexly spherical, for minimizing interference by contact between the pin 9a and the webs 41 with horizontal angling of the coupler. Its yoke 2 being unhooded, the draft rigging of the embodiment of Figure 1 requires other means for retaining its pivot pin 9 in connecting position. While various ways of retaining the pin 9 in place suggest themselves, that now preferred is the one illustrated, in which the pin has counterpart notches 43 at its opposite ends, into one of which is adapted to fit a lip 44 on one of the hinge loops 7 which extends into or overlaps the pin opening 8 therein and the other of which receives an end of a rectangular locking plate 45 which conveniently may be seated in a guideway or recess 46 in the other of the hinge loops and held in locking position by suitable means such as the illustrated cotter pin 47.

With the coupler 1 anglable universally, it is necessary that it be supported so as normally to be held at coupling height and at the same time be anglable below that height to make full use of its vertical anglability. A feature of the draft rigging of the present invention is its resilient coupler carried by which the necessary support is provided. In its preferred form, the coupler carrier, designated generally as 48, is separate from the striking casting 49 with which the front stop lugs 26 preferably are integral, and has a base plate 50 extending across and fixed, as by riveting, to the bottom flanges 51 of the center sills 25 below the universal block 14. Pivotally connected to the underside of this plate by a pivot rod, bar or pin 52 extending at its opposite ends through openings 53, one in each of a pair of transversely spaced ears 54 integral with and depending from the connecting plate, is a carrier iron 55. This carrier iron is of somewhat L-shape and has a pair of transversely spaced, longitudinally disposed legs 56 connected to the pivot rod 52 and joining at their forward ends an upright or upwardly directed leg 57, the substantially flat upper face 58 engaging the underside of the shank 4 of the coupler.

As will be noted, the pivotal axis of the carrier iron 55 is in vertical alignment with the normal center of angling of the coupler and the upper face 58 of the upright leg 57 is substantially horizontal and has full bearing with the shank of the coupler when the latter is at coupling height. As a consequence, so long as the center of angling of the coupler is in its normal position longitudinally of the center sills 25, the coupler and carrier iron act as sides of a parallelogram so as to maintain their full bearing engagement during downward angling of the coupler, thus minimizing wear on the engaging surfaces, since the coupler, under buffing or draft forces, is only momentarily shifted from its normal position.

For supporting the coupler and yieldably resisting downward swinging of the carrier iron, there are employed resilient means in the form of a pair of torsion springs 59, each coiled about the pivot rod 52 and having a forwardly extending end bearing against the underside of the carrier iron and a rearwardly extending end anchored to the base plate 50 as by sliding the rear ends before insertion of the rod 52 into channels 60 through ribs 61 downstanding from the connecting plate. Since required to swing only to the extent of the downward angling of the coupler, the carrier iron is limited in the extent of its vertical swinging or pivotal movement by stops, one pair 62 on the upper sides of the longitudinally directed legs 56 of the carrier iron for engaging the underside of the base plate 50 and limiting upward movement of the carrier iron and the other pair 63 carried by the upstanding leg 57 and adapted to engage the upper side of the base plate for limiting downward movement of the carrier iron.

Extending across the center sills 25 below the universal block 14, the base plate 50 serves not only as the means for mounting the resilient coupler carrier to the center sills but also as a tie plate for supporting the connected ends of the coupler and yoke. Also, the upper side of the base plate preferably is provided with transversely spaced guide lugs 64 between which the forward end of the yoke slides and is guided as the yoke moves longitudinally relative to the center sills.

In assembling the draft rigging of the present invention, the coupler and yoke are assembled outside of the center sills 25 by inserting the universal block 14 between the yoke arms 6 with the axis of its trunnions 20 initially disposed longitudinally of the arms and then rotating the universal block through 90° to enter the trunnions into the elongated slots 23 in the arms. Thereafter, the butt 5 of the coupler 1 is inserted through the open end of the yoke and connected to the universal block by the pivot pin 9. The coupler is then drawn forward to bring the trunnions against the front ends 24 of the slots. After insertion of the cushioning mechanism 29 and its followers 30 and 31 into the yoke, the assembly is inserted between the center sills 25 to which the striking casting 49 has already been applied. As the last steps, the coupler carrier 48, which usually will be preassembled with its pivot rod 52 held against accidental dislodgement by cotter pins 65 at either end, is applied and its base plate 50 and a rear cross tie 66 are fixed to the bottom flanges 51 of the center sills 25 to hold the coupler and yoke in place.

From the above detailed description, it will be apparent that there has been provided an improved draft rigging wherein a coupler and yoke are universally connected by a coplanar cross pin connection, the coupler being supported at coupling height by a resilient coupler carrier and the whole being of such construction and arrangement as to provide an efficient assembly of minimum over-all length and subject to a minimum of wear under service conditions. It should be understood that the described and disclosed embodiments are merely exemplary of the invention and that all modifications are intended to be included which do not depart from either the spirit of the invention or the scope of the appended claims.

I claim:

1. In a draft rigging, the combination of a coupler, a yoke, and a coplanar cross pin connection connected to and connecting between said coupler and yoke for relative universal angling thereof.

2. In a draft rigging, the combination of a coupler, a yoke, and a universal connector and having a coplanar cross pin connection connected to and connecting with said coupler and yoke for relative universal angling thereof.

3. In a draft rigging, the combination of a coupler, a yoke, a universal block having a pin connection to said coupler for relative pivotal movement therebetween, said block having a pivotal connection to said yoke for relative pivoting therebetween about an axis intersecting and disposed normal to the axis of said pin connection, said pin and pivotal connections cooperating for universally connecting said coupler and yoke.

4. In a draft rigging, the combination of a coupler, a yoke, a universal block having a pivotal connection to said coupler for relative pivotal movement therebetween, said block having a pin and slot connection to said yoke, said pin having an axis intersecting and disposed normal to the axis of said pivotal connection, and said pivotal and pin and slot connections cooperating for universally connecting said coupler and yoke.

5. In a draft rigging, the combination of a coupler having a bifurcated butt, a yoke having elongated slots in arms thereof, a universal block seating in the bifurcation in said butt and connected by pin means to said coupler for relative pivotal movement therebetween, and pin means carried by said block and projecting therefrom at right angles to and intersecting in axis with said first-named pin means, said second-named pin means seating in said slots and cooperating with said first-named pin means for universally connecting said coupler and yoke through said block.

6. In a draft rigging, the combination of a coupler, transversely spaced hinge loops on a butt of said coupler, a universal block seating between and having flange means overlying rear ends of said hinge loops, pin means pivotally connecting said coupler and universal block, confronting coaxial bearing surfaces on said flange means and hinge loops and having surface engagement during relative pivoting of said coupler and block, a yoke having elongated slots in arms thereof, trunnions projecting from opposite sides of said block normal to and intersecting in axis with said pin and seating in said slots, a front follower in said yoke and having a forwardly facing cylindrical socket normally co-axial with said trunnions, and a convexly cylindrical surface on the rear face of said block bearing against said socket and normally coaxial therewith for surface contact therebetween on angling of said block relative to said yoke.

7. In a draft rigging, the combination of a coupler, transversely spaced hinge loops on the butt of said coupler, a universal block seating between and having flange means overlying rear ends of said hinge loops, pin means pivotally connecting said coupler and universal block, confronting coaxial bearing surfaces on said flange means and hinge loops and having surface engagement during relative pivoting of said coupler and block, a yoke having elongated slots in arms thereof, trunnions projecting from opposite sides of said block normal to and intersecting in axis with said pin and seating in said slots, a front follower in said yoke and having a forwardly facing cylindrical socket normally coaxial with said trunnions, a convexly cylindrical surface on the rear face of said block bearing against said socket and normally coaxial therewith for surface contact therebetween on angling of said block relative to said yoke, and means on said block and each of said coupler and said front follower for limiting the free angling therebetween.

8. In a draft rigging, the combination of a coupler, transversely spaced hinge loops on the butt of said coupler, a universal block seating between and having flange means overlying rear ends of said hinge loops, pin means pivotally connecting said coupler and universal block, confronting coaxial bearing surfaces on said flange means and hinge loops and having surface engagement during relative pivoting of said coupler and block, a yoke having elongated slots in arms thereof, trunnions projecting from opposite sides of said block normal to and intersecting in axis with said pin and seating in said slots, a front follower in said yoke and having a forwardly facing cylindrical socket normally coaxial with said trunnions, a convexly cylindrical surface on the rear face of said block bearing against said socket and normally coaxial therewith for surface contact therebetween on angling of said block relative to said yoke, and flat limiting surfaces on said block and each engageable with an associated, normally spaced flat surface on one of said coupler and follower for limiting the extent of free relative angling between said coupler and yoke.

9. A draft rigging comprising a coupler having a bifurcated butt, a hooded yoke having longitudinally elongated slots in arms thereof, a universal block seating in the bifurcation in said butt, pin means pivotally connecting said coupler and block and confined by the hooded portion of said yoke against accidental displacement, and pin means carried by and projecting from opposite sides of said block normal to and intersecting in axis with said first-named pin means, said pin means cooperating for universally connecting said coupler and yoke through said block.

10. A draft rigging comprising a coupler having a bifurcated butt, a hooded yoke having longitudinally elongated slots in arms thereof, a universal block seating in the bifurcation in said butt, a pin having arcuately convex ends pivotally connecting said coupler and block and confined by the hooded portion of said yoke against accidental displacement, and pin means carried by and projecting from opposite sides of said block normal to and intersecting in axis with said first-named pin means, said pin means cooperating for universally connecting said coupler and yoke through said block.

11. In a draft rigging carried by center sills of a railway car, the combination of a coupler, a yoke, a coplanar cross pin connection connected to and connecting said coupler and yoke for universal relative angling thereof, a resilient coupler carrier having a carrier iron engaging a shank of said coupler and connected to said center sills for pivoting about an axis in vertical alignment with the normal center of relative angling of said coupler and yoke for maintaining substantial surface contact with said shank during downward angling of said coupler, and resilient means for yieldably resisting downward movement of said carrier iron and therethrough normally maintaining said coupler at coupling height.

12. In a draft rigging carried by center sills of a railway car, the combination of a coupler, a yoke, a coplanar cross pin connection between said coupler and yoke for universal relative angling thereof, a resilient coupler carrier having a carrier iron engaging a shank of said coupler and connected to said center sills for pivoting about an axis in vertical alignment with the normal center of relative angling of said coupler and yoke for maintaining substantial surface contact with said shank during downward angling of said coupler, and torsion spring means for yieldably resisting downward movement of said carrier iron and therethrough normally maintaining said coupler at coupling height.

13. In a draft rigging carried by center sills of a railway car, the combination of a coupler, a yoke, a coplanar cross pin connection between said coupler and yoke for universal relative angling thereof, a resilient coupler carrier having a carrier iron engaging a shank of said coupler and connected to said center sills for pivoting about an axis in vertical alignment with the normal center of relative angling of said coupler and yoke for maintaining substantial surface contact with said shank during downward angling of said coupler, torsion spring means for yieldably resisting downward movement of said carrier iron and therethrough normally maintaining said coupler at coupling height, and means for limiting the extent of pivoting of said carrier iron.

14. In a draft rigging, the combination with a yoke seated between center sills of a railway car and connected for relative angling to a coupler, of a resilient coupler carrier comprising a base plate fixed to said center sills beneath the center of relative angling of said coupler and yoke, a carrier iron engaging a shank of said coupler and pivotally connected to the underside of said base plate for pivoting in vertical alignment with the normal center of angling of said coupler and yoke, means carried by said carrier iron and engageable with opposite faces of said base plate for limiting the extent of pivoting of said carrier iron, and resilient means interposed between and acting on said carrier iron and base plate for yieldably resisting downward movement of said carrier iron under force of said coupler.

15. In a draft rigging, the combination with a yoke seated between center sills of a railway car and connected for relative angling to a coupler, of a resilient coupler carrier comprising a base plate fixed to said center sills beneath the center of relative angling of said coupler and yoke, a carrier iron having a substantially flat upper face underlying and in surface contact with a shank of said coupler in the normal position thereof, said carrier iron being pin-connected to ears downstanding from said base plate for pivoting vertically about an axis in vertical alignment with the normal center of relative angling of said coupler and yoke, means on said carrier iron and engageable with said base plate for limiting the extent of pivoting of said carrier iron, and torsion spring means encircling the connecting pin and reacting against said carrier iron and base plate for yieldably resisting downward movement of said carrier iron.

16. In a draft rigging, the combination with a yoke seated between center sills of a railway car and connected for relative angling to a coupler, of a resilient coupler carrier comprising a base plate fixed to said center sills beneath the center of relative angling of said coupler and yoke, guide lugs on an upper face of said base plate for guiding said yoke on longitudinal movement thereof relative to said center sills, transversely spaced ears depending from said plate, a carrier iron engageable with a shank of said coupler and pivotally connected to said plate for vertical pivoting in vertical alignment with the normal center of relative angling of said coupler and yoke, and torsion spring means interposed between said carrier iron and base plate for yieldably resisting downward pivoting of said carrier iron.

17. In a draft rigging, the combination of a coupler having bifurcated butt, a yoke having longitudinally elongated slots in arms thereof, a universal block seating in the bifurcation in said butt, a pivot pin extending through and pivotally connecting said block and butt, means carried by said coupler for releasably locking said pin in coupling position, and pin means projecting from opposite sides of said block and normal to and intersecting in axis with said pin for seating in said slots in said yoke arms and through said block and pin universally connecting said coupler and yoke.

18. A draft rigging comprising a coupler having transversely spaced hinge loops on the butt thereof and including therebetween a socket, a universal block having flange portions overlying ends of said loops and a tongue seating in said socket, pin means pivotally connecting said coupler and block, substantially coradial cylindrical bearing surfaces on said flange portions and hinge loops and on front ends of said tongue and socket, said bearing surfaces being coaxial with said pin, normally spaced flat surfaces at opposite sides of the confronting cylindrical surfaces on said socket and coupler for limiting relative angling of said coupler and block about the axis of said pin, a yoke having longitudinally elongated slots in arms thereof, trunnions projecting from opposite sides of said block and in axis normal to and intersecting the axis of said pin, said trunnions being received in said slots for pivotally connecting said yoke and block, a front follower within said yoke, said front follower having in a forward face of a thickened portion thereof a cylindrical socket normally coaxial with said trunnions, a convexly cylindrical surface on a rear face of said block bearing against and normally coaxial with said socket, and normally angularly disposed spaced substantially flat surfaces on confronting faces of said follower and block at opposite sides of said cylindrical surfaces for limiting the relative angling of said block and follower about the axis of said trunnion.

References Cited in the file of this patent

UNITED STATES PATENTS

| | | |
|---|---|---|
| 1,645,540 | O'Connor | Oct. 18, 1927 |
| 1,920,410 | Lorenz et al. | Aug. 1, 1933 |
| 1,961,354 | Haseltine | June 5, 1934 |
| 2,240,363 | Barrows et al. | Apr. 29, 1941 |
| 2,254,302 | Metzger | Sept. 2, 1941 |
| 2,431,864 | Dean | Dec. 2, 1947 |
| 2,844,949 | Stillwagon | July 29, 1958 |

FOREIGN PATENTS

| | | |
|---|---|---|
| 159,562 | Switzerland | Apr. 1, 1933 |

UNITED STATES PATENT OFFICE
CERTIFICATE OF CORRECTION

Patent No. 2,956,693 October 18, 1960

Emil H. Blattner

It is hereby certified that error appears in the above numbered patent requiring correction and that the said Letters Patent should read as corrected below.

Column 6, line 62, before "connected" insert -- between and --; line 63, strike out -- between --; line 66, after "connector" insert -- between --; line 67, strike out "with".

Signed and sealed this 10th day of October 1961.

(SEAL)
Attest:

ERNEST W. SWIDER
Attesting Officer

DAVID L. LADD
Commissioner of Patents
USCOMM-DC